United States Patent
Ramasamy et al.

(10) Patent No.: US 11,526,784 B2
(45) Date of Patent: Dec. 13, 2022

(54) REAL-TIME SERVER CAPACITY OPTIMIZATION TOOL USING MAXIMUM PREDICTED VALUE OF RESOURCE UTILIZATION DETERMINED BASED ON HISTORICA DATA AND CONFIDENCE INTERVAL

(71) Applicant: BANK OF AMERICA CORPORATION, Charlotte, NC (US)

(72) Inventors: Suki Ramasamy, Chennai (IN); Mahesh Ganesan, Chennai (IN); Vipul Chaudhari, Gurugram (IN); Srinivasan Bhaskaran Kasyap, Chennai (IN); Debendra Sharma, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 362 days.

(21) Appl. No.: 16/816,527

(22) Filed: Mar. 12, 2020

(65) Prior Publication Data
US 2021/0287112 A1 Sep. 16, 2021

(51) Int. Cl.
| | | |
|---|---|---|
| G06N 5/04 | (2006.01) | |
| G06F 16/2458 | (2019.01) | |
| G06F 9/50 | (2006.01) | |
| G06N 5/02 | (2006.01) | |
| G06N 20/00 | (2019.01) | |
| G06N 5/00 | (2006.01) | |

(52) U.S. Cl.
CPC ............ *G06N 5/04* (2013.01); *G06F 9/5027* (2013.01); *G06F 16/2462* (2019.01); *G06N 5/02* (2013.01); *G06F 9/5077* (2013.01); *G06N 5/003* (2013.01); *G06N 5/046* (2013.01); *G06N 20/00* (2019.01)

(58) Field of Classification Search
CPC ............ G06N 5/04; G06N 5/02; G06N 5/046; G06N 5/003; G06N 20/00; G06F 9/5027; G06F 16/2462; G06F 9/5077
See application file for complete search history.

(56) References Cited

U.S. PATENT DOCUMENTS

| | | |
|---|---|---|
| 7,171,668 B2 | 1/2007 | Molloy et al. |
| 7,305,471 B2 | 12/2007 | Odhner et al. |
| 7,403,886 B2 | 7/2008 | Odhner et al. |
| 8,055,951 B2 | 11/2011 | Ben-Yehuda et al. |
| 9,213,565 B2 | 12/2015 | Ionescu et al. |

(Continued)

*Primary Examiner* — Michael W Ayers

(57) ABSTRACT

A system includes a server associated with a resource utilization, a database storing historical data including resource utilization values over a first time period, and a processor. The processor identifies, from the historical data, a maximum resource utilization value and determines a duration of time for which the resource utilization exceeds a percentage of the maximum. The processor predicts, based on the historical data, a maximum predicted resource utilization value over a second time period, later than the first. The processor also determines, based on the historical data, an upper bound of a resource utilization confidence interval. The processor generates, based on the maximum value over the first time period, the duration of time, the maximum predicted value over the second time period, and the upper bound, a recommendation to consolidate the server with a second server and/or to release computational resources. The processor transmits the recommendation to an administrator.

18 Claims, 7 Drawing Sheets

(56) References Cited

U.S. PATENT DOCUMENTS

| | | |
|---|---|---|
| 9,363,190 B2 | 6/2016 | Beloglazov et al. |
| 9,372,734 B2 | 6/2016 | Andreatta et al. |
| 9,565,129 B2 | 2/2017 | Bai et al. |
| 9,910,696 B2 | 3/2018 | Dow et al. |
| 10,043,255 B1 | 8/2018 | Pathapati et al. |
| 10,193,811 B1 | 1/2019 | Satyanarayana et al. |
| 10,210,751 B1 | 2/2019 | Eno et al. |
| 10,270,644 B1 | 4/2019 | Secchi et al. |
| 10,277,524 B1 | 4/2019 | Kaitha et al. |
| 10,332,261 B1 | 6/2019 | Farivar et al. |
| 10,341,253 B2 | 7/2019 | Monda et al. |
| 10,353,863 B1 | 7/2019 | Deshpande et al. |
| 10,410,056 B1 | 9/2019 | Bermudez et al. |
| 10,419,607 B1 | 9/2019 | Mossoba et al. |
| 10,423,403 B1 | 9/2019 | Natarajan et al. |
| 10,439,891 B2 | 10/2019 | Baughman et al. |
| 10,445,738 B1 | 10/2019 | Waters et al. |
| 10,452,441 B1 | 10/2019 | Subramanian et al. |
| 10,468,014 B1 | 11/2019 | Edwards et al. |
| 10,474,981 B1 | 11/2019 | Mossoba et al. |
| 10,484,301 B1 * | 11/2019 | Shukla ................. H04L 47/823 |
| 10,489,512 B2 | 11/2019 | Jezewski |
| 10,490,191 B1 | 11/2019 | Benkreira et al. |
| 10,521,419 B1 | 12/2019 | Swamy et al. |
| 10,525,850 B1 | 1/2020 | Tang et al. |
| 10,565,475 B2 | 2/2020 | Lecue et al. |
| 2007/0233866 A1 * | 10/2007 | Appleby ............... H04L 67/101 709/226 |
| 2012/0053925 A1 | 3/2012 | Geffin et al. |
| 2015/0039764 A1 * | 2/2015 | Beloglazov ........... G06F 9/5088 709/226 |
| 2015/0052250 A1 * | 2/2015 | Doganata .............. G06F 9/5083 709/226 |
| 2018/0024860 A1 * | 1/2018 | Balle ..................... G06F 9/0653 718/104 |
| 2018/0114136 A1 | 4/2018 | Kumar et al. |
| 2018/0165109 A1 | 6/2018 | Feng et al. |
| 2018/0349844 A1 | 12/2018 | Bounasser et al. |
| 2018/0373579 A1 | 12/2018 | Rathore et al. |
| 2019/0036789 A1 | 1/2019 | Kaplunov et al. |
| 2019/0147371 A1 | 5/2019 | Deo et al. |
| 2019/0163517 A1 * | 5/2019 | Fontoura ............... G06F 9/5005 |
| 2019/0182120 A1 | 6/2019 | Coccia et al. |
| 2019/0250949 A1 * | 8/2019 | Chen ..................... H04L 41/14 |
| 2019/0306736 A1 | 10/2019 | Konstantinou et al. |
| 2019/0317826 A1 | 10/2019 | Jain et al. |
| 2019/0370083 A1 | 12/2019 | Demeilliez et al. |
| 2019/0386889 A1 * | 12/2019 | Noorshams ............. H04L 47/70 |
| 2020/0065213 A1 * | 2/2020 | Poghosyan ......... G06F 11/3409 |
| 2020/0104230 A1 * | 4/2020 | Hasija ................. G06F 11/3072 |
| 2020/0183758 A1 | 6/2020 | Subramaniam ........ G06F 9/4856 |
| 2021/0042820 A1 * | 2/2021 | Kumar ..................... G06N 3/08 |
| 2021/0182387 A1 * | 6/2021 | Zhu ....................... G06F 21/554 |

\* cited by examiner

REAL-TIME SERVER CAPACITY OPTIMIZATION TOOL USING MAXIMUM PREDICTED VALUE OF RESOURCE UTILIZATION DETERMINED BASED ON HISTORICA DATA AND CONFIDENCE INTERVAL

TECHNICAL FIELD

This invention relates generally to server architecture and usage, and specifically to a real-time server capacity optimization tool.

BACKGROUND

In many large data centers, server utilization rates may not be optimal. For example, some servers may be underutilized, resulting in an inefficient use of computer resources and unnecessary infrastructure complexity. On the other hand, other servers may be operating at or near capacity, risking performance issues and potential failures of the applications running on the servers.

SUMMARY

This disclosure contemplates a real-time server capacity optimization tool that may be used to monitor a set of servers and to automatically reconfigure the servers to address server underutilization and/or overutilization. The tool identifies sub-optimal server capacity by monitoring and analyzing the historical resource utilization of each server in terms of its percentage utilization of disk storage, CPU, and/or RAM. Based on this historical resource utilization data, the tool predicts maximum resource utilizations of the server, from which the tool may identify an under/overutilization of the server. In response to identifying an underutilized server, the tool may release a portion of the computational resources of the server and/or consolidate the server with one or more other servers. In this manner, certain embodiments may free up valuable computational resources for use by overutilized servers and improve the overall efficiency of the server system. Certain embodiments of the tool are described below.

According to one embodiment, a system includes a first server, a database, and a hardware processor. The first server is associated with a resource utilization. The database stores historical data for the first server. The historical data includes values of the resource utilization of the first server collected from the first server over a first period of time. The hardware processor identifies, from the historical data, a maximum value of the resource utilization of the first server collected from the first server over the first period of time. The processor also determines, from the historical data, a first duration of time for which the values of the resource utilization of the first server collected from the first server over the first period of time exceed a given percentage of the maximum value. The processor additionally predicts, based on the historical data, a maximum predicted value of the resource utilization of the first server over a second period of time later than the first period of time. The processor further determines, based on the historical data, a first confidence interval for the resource utilization of the first server. The first confidence interval includes an upper bound. The processor also generates, based at least on the maximum value of the resource utilization of the first server collected from the first server over the first period of time, the first duration of time, the maximum predicted value of the resource utilization of the first server over the second period of time, and the upper bound, a recommendation. The recommendation includes at least one of a recommendation to consolidate the first server with a second server and a recommendation to release computational resources of the first server. The processor additionally transmits the recommendation to a system administrator.

According to another embodiment, a method includes accessing historical data for a first server. The first server is associated with a resource utilization. The historical data includes values of the resource utilization of the first server collected from the first server over a first period of time. The method also includes identifying, from historical data, a maximum value of the resource utilization of the first server collected from the first server over the first period of time. The method additionally includes determining, from the historical data, a first duration of time for which the values of the resource utilization of the first server collected from the first server over the first period of time exceed a given percentage of the maximum value. The method further includes predicting, based on the historical data, a maximum predicted value of the resource utilization of the first server over a second period of time later than the first period of time. The method also includes determining, based on the historical data, a first confidence interval for the resource utilization of the first server. The first confidence interval includes an upper bound. The method additionally includes generating, based at least on the maximum value of the resource utilization of the first server collected from the first server over the first period of time, the first duration of time, the maximum predicted value of the resource utilization of the first server over the second period of time, and the upper bound, a recommendation. The recommendation includes at least one of a recommendation to consolidate the first server with a second server and a recommendation to release computation resources of the first server. The method further includes transmitting the recommendation to a system administrator.

According to a further embodiment, an apparatus includes a hardware processor. The processor accesses a database storing historical data for a first server. The first server is associated with a resource utilization. The historical data includes values of the resource utilization of the first server collected from the first server over a first period of time. The processor also identifies, from the historical data, a maximum value of the resource utilization of the first server collected from the first server over the first period of time. The processor additionally determines, from the historical data, a first duration of time for which the values of the resource utilization of the first server collected from the first server over the first period of time exceed a given percentage of the maximum value. The processor further predicts, based on the historical data, a maximum predicted value of the resource utilization of the first server over a second period of time later than the first period of time. The processor also determines, based on the historical data, a first confidence interval for the resource utilization of the first server. The first confidence interval includes an upper bound. The processor additionally generates, based at least on the maximum value of the resource utilization of the first server collected from the first server over the first period of time, the first duration of time, the maximum predicted value of the resource utilization of the first server over the second period of time, and the upper bound, a recommendation. The recommendation includes at least one of a recommendation to consolidate the first server with a second server and a recommendation to release computation resources of the first server. The processor further transmits the recommendation to a system administrator.

Certain embodiments provide one or more technical advantages. As an example, an embodiment reduces the overall computational resources consumed by a data center, by consolidating underutilized servers. As another example, an embodiment improves the performance of the applications running on the servers, by reducing the occurrence of downtime associated with application failures arising from server overutilization. The system described in the present disclosure may particularly be integrated into a practical application of a server capacity optimization tool for use by an organization to reduce infrastructure complexity and improve the efficiency of the organization's server resources, as compared to a traditional server system operating without the tool. In particular, the tool may be used to continuously monitor any number of servers belonging to the organization, to automatically identify sub-optimal server capacity and reconfigure the servers accordingly.

Certain embodiments may include none, some, or all of the above technical advantages. One or more other technical advantages may be readily apparent to one skilled in the art form the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages may be understood by referring to FIGS. 1 through 4 of the drawings, like numerals being used for like and corresponding parts of the various drawings.

I. System Overview

Figure 1:
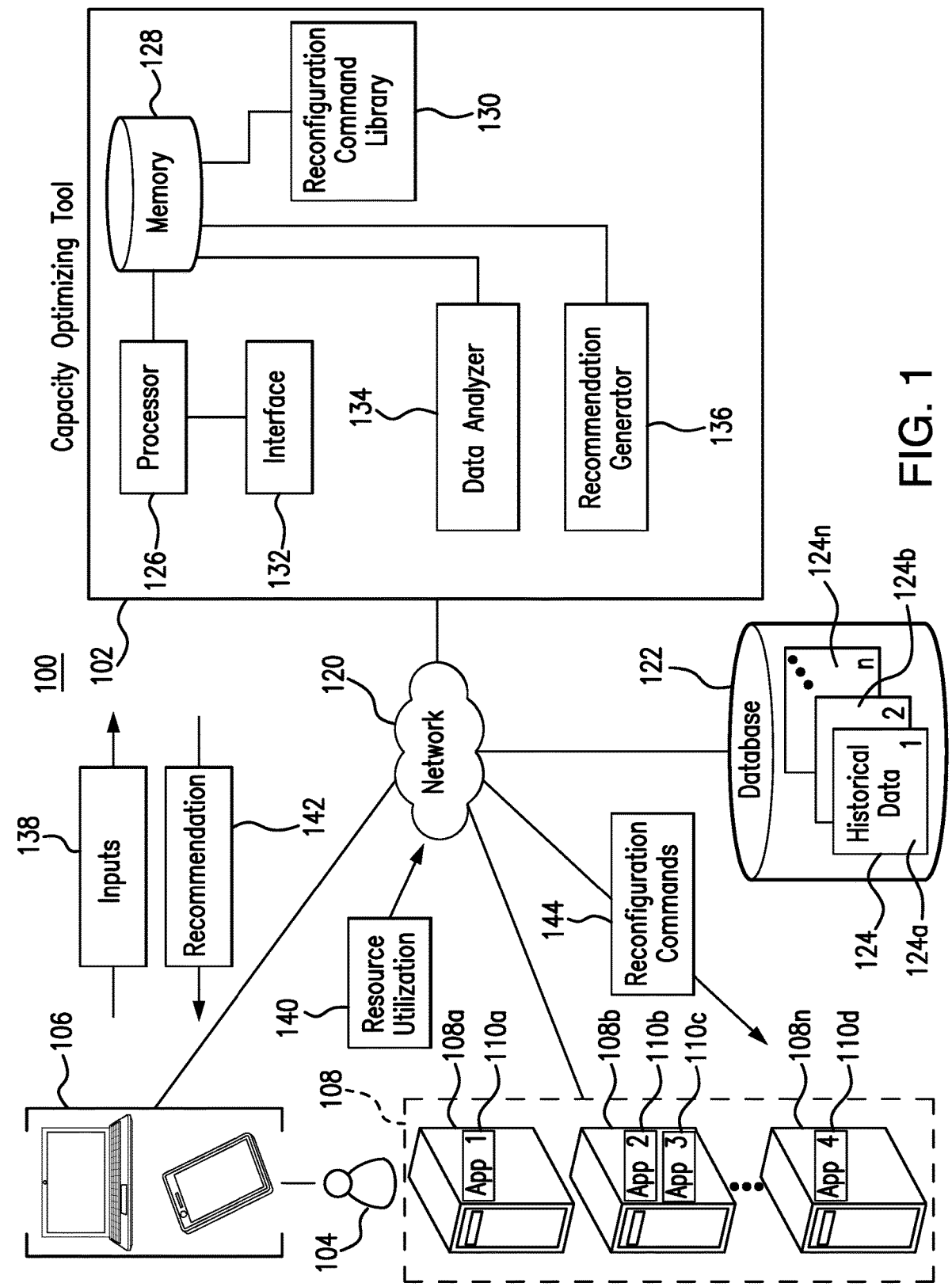
FIG. 1 illustrates an example server capacity optimization system.

FIG. 1 illustrates an example system 100 that includes capacity optimizing tool 102, user(s) 104, device(s) 106, network 108, servers 110, and database 122. Generally, capacity optimizing tool 102 monitors servers 110, identifies sub-optimal server resource utilization, and generates recommendations of modifications that may be made to servers 110, such that servers 110 operate at, near, or closer to their optimal capacities. For example, the recommendations may include recommendations to consolidate two or more servers into one or more servers, release resources belonging to a server, and/or add additional resources to a server. In certain embodiments, capacity optimizing tool 102 sends recommendations 142 to system administrators 104, for implementation of the recommendations. In some embodiments, capacity optimizing tool 102 automatically implements the recommendations, by generating and/or executing reconfiguration commands 144. The manner by which capacity optimizing tool 102 performs such tasks will be described in further detail below, in the discussion of FIGS. 2 through 3D.

Devices 106 may be used by users 104 to send inputs 138 to capacity optimizing tool 102 and/or to receive outputs 142 from capacity optimizing tool 102. In certain embodiments, input 138 may include a request for capacity optimizing tool 102 to transmit recommendations to user 104, as output 142. For example, in certain embodiments, capacity optimizing tool 102 may analyze historical data 124 at regular intervals and then transmit recommendations 142, based on such analysis, to user 104 in response to a request 138 for such recommendations. As another example, in some embodiments, capacity optimizing tool 102 may both analyze historical data 124 and transmit recommendations 142 in response to receiving a request 138 for such recommendations from user 104. In some embodiments, transmitting recommendations 142 to user 104 may include displaying a graphical user interface on device 106, where the graphical user interface depicts the recommendations.

In certain embodiments, inputs 138 may include inputs for use by capacity optimizing tool 102 in analyzing historical data 124. For example, as described in further detail below, in the discussion of FIGS. 2 and 3A, capacity optimizing tool 102 may apply a forecasting algorithm to historical data 124, to predict the maximum resource utilizations of each server 110 over an interval of time in the future. Input 138 may include a specification of such future time interval. As another example, as described in further detail below, in the discussion of FIGS. 2 and 3B, capacity optimizing tool 102 may analyze historical data 124 to identify a confidence interval for the maximum resource utilization of each server 110. Input 138 may include a specification of the confidence level to use for such confidence interval. In addition to these examples, input 138 may include any other appropriate inputs for use by capacity optimizing tool 102 in analyzing historical data 124.

Devices 106 include any appropriate device for communicating with components of system 100 over network 108. For example, devices 106 may be a telephone, a mobile phone, a computer, a laptop, a wireless or cellular telephone, a tablet, a server, and IoT device, and/or an automated assistant, among others. This disclosure contemplates devices 106 being any appropriate device for sending and receiving communications over network 108. Device 106 may also include a user interface, such as a display, a microphone, keypad, or other appropriate terminal equipment usable by user 104. In some embodiments, an application executed by a processor of device 106 may perform the functions described herein.

Network 108 facilitates communication between and amongst the various components of system 100. This disclosure contemplates network 108 being any suitable network operable to facilitate communication between the components of system 100. Network 108 may include any interconnecting system capable of transmitting audio, video, signals, data, messages, or any combination of the preceding. Network 108 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Servers 110 may be located on, or otherwise connected to, network 108. System 100 may include any number of servers 110a through 110n. Servers 110 may include application servers, database servers, file servers, mail servers, print servers, web servers, or any other type of server that provides computational functionality to users 104. For example, servers 110 may be used to test and/or run applications 112a through 112d. An application 112 submitted to servers 110 may use one or more servers 110 when executing. When an application uses more than one server 110, communication between those servers used by the application may occur over network 108.

Each server 110a through 110n is associated with a set of computational resources. These computational resources may include one or more central processing units (CPUs), an amount of random-access memory (RAM), an amount of disk storage, and/or any other computational resources associated with servers 110a through 110n. Applications 112a through 112d, running on servers 110a through 110n, consume at least a portion of the computational resources of the servers. For example, application 110a, running on server 110a, consumes a portion of the CPU, RAM, and disk storage of server 110a. Accordingly, each server 110a through 110n is associated with a resource utilization 140, indicating the percentage utilization of one or more of the server's computational resources. For example, the resource utilization for server 110a may indicate that 30% of the server's CPUs are currently in use, 45% of the server's RAM is currently in use, and 23% of the server's disk storage is currently in use.

In certain embodiments, servers 110 may include cloud-based servers. For example, servers 110 may include virtual servers running in a cloud computing environment offered by a hosting provider. In such embodiments, adjusting the computational resources associated with a given cloud-based server may include sending a reconfiguration command 144 to the hosting provider. For example, a reconfiguration command 144 may be used to release a portion of the computational resources associated with cloud-based server 110a. In some embodiments, servers 110 may include on-premises, physical servers. For example, servers 110 may include physical servers located in a datacenter operated by an organization running capacity optimizing tool 102. In such embodiments, adjusting the computational resources associated with a given physical server may include sending a recommendation 142 to a system administrator 104, to physically adjust the computation resources of the server. For example, in response to receiving a recommendation 142 to release 50% of the RAM associated with server 110a, a system administrator 104 may physically remove one or more RAM cards from server 110a.

Database 122 stores historical data 124 gathered from servers 110a through 110n. For example, for each server 110a through 110n, database 122 may store historical data 124a through 124n, corresponding to the historical resource utilization of the server, collected from the server over time. For each server 110, historical data 124 may include the percentage utilization of the server's CPU, RAM, and/or disk storage over time. In certain embodiments, historical data 124 is collected from each server 110 at regular time intervals. For example, historical data 124 may be collected from each server 110 every second, minute, or any other appropriate time interval. In some embodiments, historical data 124 may be collected from each server 110 at irregular intervals.

As seen in FIG. 1, capacity optimizing tool 102 includes a processor 126, a memory 128, and an interface 132. This disclosure contemplates processor 126, memory 128, and interface 132 being configured to perform any of the functions of capacity optimizing tool 102 described herein. Generally, capacity optimizing tool 102: (1) collects resource utilization data 140 from servers 110; (2) stores the resource utilization data as historical data 124 in database 122; (3) implements data analyzer 134, to generate an analysis of the historical data, which may be used to identify any underutilized and/or overutilized servers 110, as described in further detail below, in the discussion of FIGS. 2 through 3D; and (4) implements recommendation generator 136 to generate one or more recommendations for improving/optimizing the resource utilization of servers 110, based on the identification of any underutilized and/or overutilized servers 110, as described in further detail below, in the discussion of FIG. 2. In certain embodiments, capacity optimizing tool 102 also transmits the recommendations to system administrators 104, as output 142. In some embodiments, capacity optimizing tool 102 automatically implements the recommendations, by generating reconfiguration commands 144, which are executed on servers 110.

Processor 126 is any electronic circuitry, including, but not limited to microprocessors, application specific integrated circuits (ASIC), application specific instruction set processor (ASIP), and/or state machines, that communicatively couples to memory 128 and controls the operation of capacity optimizing tool 102. Processor 126 may be 8-bit, 16-bit, 32-bit, 64-bit or of any other suitable architecture. Processor 126 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 126 may include other hardware and software that operates to control and process information. Processor 126 executes software stored on memory to perform any of the functions described herein. Processor 126 controls the operation and administration of capacity optimizing tool 102 by processing information received from network 108, device(s) 106, memory 128, and interface 132. Processor 126 may be a programmable logic device, a microcontroller, a microprocessor, any suitable processing device, or any suitable combination of the preceding. Processor 126 is not limited to a single processing device and may encompass multiple processing devices.

Memory 128 may store, either permanently or temporarily, data, operational software, or other information for processor 126. Memory 128 may include any one or a combination of volatile or non-volatile local or remote devices suitable for storing information. For example, memory 128 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 128, a disk, a CD, or a flash drive. In particular embodiments, the software may include an application executable by processor 126 to perform one or more of the functions described herein.

In certain embodiments, memory 128 may also store a library of reconfiguration commands 130. The library of reconfiguration commands 130 may include commands that may be submitted to the host provider of servers 110, to reconfigure the computational resources associated with servers 110. For example, the library of reconfiguration commands 130 may include commands to consolidate servers 110, release computational resources associated with a server 110, and/or add computational resources to a server 110.

Interface 132 is configured to enable wired and/or wireless communications. Interface 132 is configured to communicate data between capacity optimizing tool 102 and other components of system 100 (e.g., other network devices, systems, or domain(s)). For example, interface 132 may comprise a WIFI interface, a local area network (LAN) interface, a wide area network (WAN) interface, a modem, a switch, or a router. Processor 126 is configured to send and receive data using interface 132. Interface 132 may be configured to use any suitable type of communication protocol as would be appreciated by one of ordinary skill in the art.

Modifications, additions, or omissions may be made to the systems described herein without departing from the scope of the invention. For example, system 100 may include any number of users 104, devices 106, networks 108, servers 110, and databases 122. The components may be integrated or separated. Moreover, the operations may be performed by more, fewer, or other components. Additionally, the operations may be performed using any suitable logic comprising software, hardware, and/or other logic.

II. Example Operation of the Server Capacity Optimizing Tool

Figure 2:
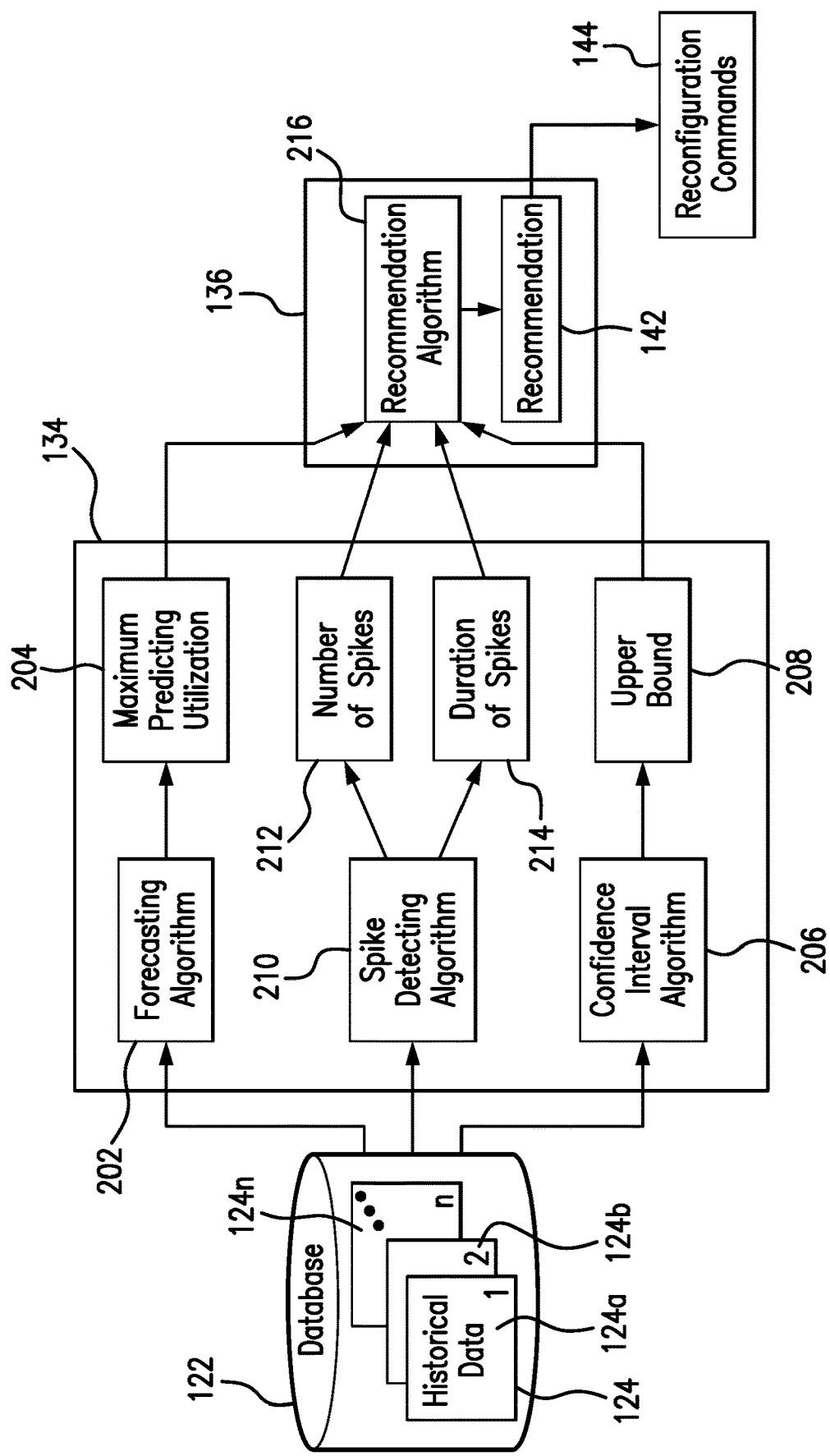
FIG. 2 illustrates the data analyzer and recommendation generator components of the server capacity optimizing tool of the system of FIG. 1.

As described above, capacity optimizing tool 102 identifies servers 110 operating at sub-optimal capacity, based on historical data 124 collected from the servers and stored in database 122. Capacity optimizing tool 102 then generates reconfiguration recommendations 142 for such servers. FIG. 2 presents an example of the operation of data analyzer 134 of capacity optimizing tool 102 in analyzing historical data 124 and an example of the operation of recommendation generator 136 of capacity optimizing tool 102 in using the analysis performed by data analyzer 134 to generate reconfiguration recommendations 142. FIGS. 3A through 3D present specific examples of the types of analyses performed by data analyzer 134.

As illustrated in FIG. 2, data analyzer 134 operates on historical data 124. For each server 110a through 110n, historical data 124a through 124n may include the percentage utilization of the server's CPU, RAM, disk storage, and/or any other suitable computational resources collected from the server over time. In certain embodiments, historical data 124 is collected from each server 110 at regular time intervals. For example, historical data 124 may be collected from each server 110 every second, minute, or any other appropriate time interval. In some embodiments, historical data 124 may be collected from each server 110 at irregular intervals. In certain embodiments, capacity optimizing tool 102 collects historical data 124 from each server 110 by accessing a log file generated by the server and stored on the server.

Data analyzer 134 performs a number of different data analysis techniques on historical data 124, the results of which may be used by recommendation algorithm 216 to identify those servers 110 operating at sub-optimal capacities. Examples of potential data analysis techniques that may be used by data analyzer 134 are presented below.

a. Maximum Forecasted Capacity

As a first example, in certain embodiments, and as illustrated in FIG. 2, data analyzer 134 may apply forecasting algorithm 202 to historical data 124. Data analyzer 134 may use forecasting algorithm 202 to determine maximum predicted resource utilizations 204 for each server 110a through 110n over a given future time interval. For example, data analyzer 134 may apply forecasting algorithm 202 to historical data 124a to determine maximum predicted resource utilizations 204 for server 110a over the given future time interval, where the maximum predicted resource utilizations 204 may include a maximum predicted CPU utilization, a maximum predicted RAM utilization, a maximum predicted disk storage utilization, and/or a maximum predicted utilization of any other suitable computational resource of server 110a.

Figure 3A:
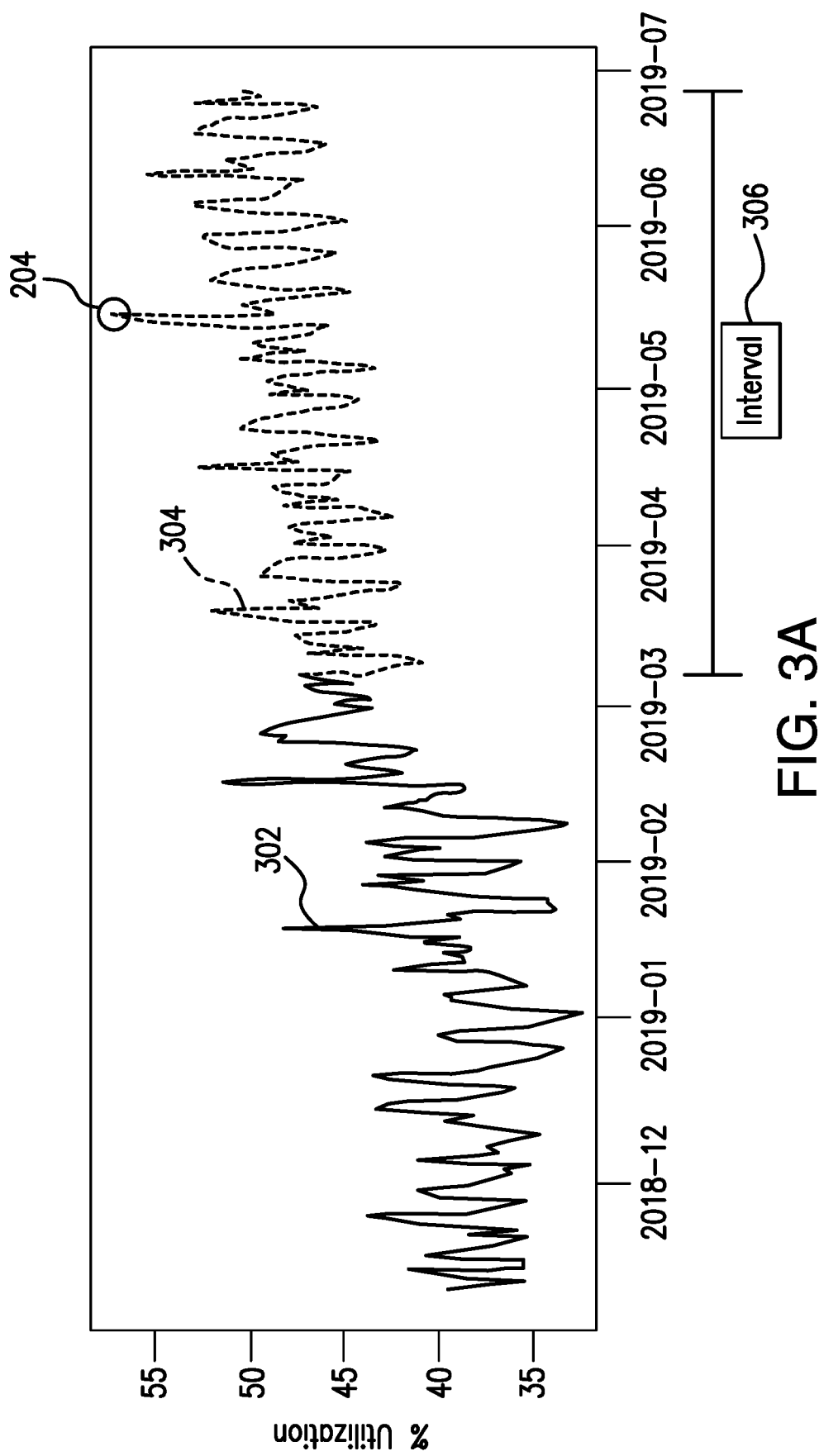
FIG. 3A presents an example capacity forecast generated by the data analyzer component of the server capacity optimizing tool of the system of FIG. 1.

In certain embodiments, data analyzer 134 may determine maximum predicted resource utilizations 204 by applying forecasting algorithm 202 to historical data 124 to determine a set of predicted resource utilizations covering the given future time interval and then identifying the maximum predicted resource utilization from the set of predicted resource utilizations. For example, FIG. 3A presents an example of applying forecasting algorithm 202 to the historical RAM utilization 302 of a server 110 to generate predictions of the RAM utilization 304 of the server 110 over future time interval 306. As illustrated in FIG. 3A, the maximum predicted RAM utilization 204 may be identified as the maximum of the predicted RAM utilization 304. Future time interval 306 may be any suitable time interval over which forecasting algorithm 202 may generate resource utilization predictions 304. For example, future time interval 306 may be a week, a month, six months, one year, or any other suitable time interval. In certain embodiments, future time interval 306 may be customizable by user 104 (e.g., user 104 may specify future time interval 306 through input 138).

Forecasting algorithm 202 may be any suitable algorithm configured to predict values for the future resource utilization 304 of a server 110, based on the historical resource utilization 302 of the server, stored in historical data 124. For example, in certain embodiments, forecasting algorithm 202 may perform a time-series analysis of historical resource utilization 302. In some embodiments, forecasting algorithm 202 may decompose the historical resource utilization 302 into a trend component, a seasonal component, and a random component, and predict values for the future resource utilization 304, based on these individual components. Examples of specific forecasting algorithms 202 that may be used by data analyzer 134 include the Holt-Winters forecasting algorithm, the Autoregressive Integrated Moving Average (ARIMA) forecasting algorithm, and the Error, Trend, Seasonality (ETS) forecasting algorithm, among others. Additionally, forecasting algorithm 202 may be a machine learning algorithm trained to predict values for future resource utilization 304, based on historical resource utilization 302. For example, forecasting algorithm 202 may be a long short-term memory (LTSM) machine learning algorithm, a recurrent neural network (RNN), or any other suitable machine learning algorithm.

b. Capacity Confidence Interval

As another example of a potential data analysis technique that may be used by data analyzer 134 to analyze historical data 124, in certain embodiments, and as illustrated in FIG. 2, data analyzer 134 may apply confidence interval algorithm 206 to historical data 124. Data analyzer 134 may use confidence interval algorithm 206 to estimate a confidence interval (e.g., a range of values between a lower bound and an upper bound 208) for the resource utilization of a server 110, where the confidence interval is associated with a given confidence level that the actual resource utilization of the server lies within the estimated range. For example, data analyzer 134 may use confidence interval algorithm 206 to estimate a range of values for the resource utilization of server 110, such that a 99.997% likelihood exists that the maximum resource utilization lies within the estimated range (i.e., a 99.997% likelihood exists that the maximum resource utilization lies below upper bound 208 of the confidence interval). Data analyzer 134 may use confidence interval algorithm 206 to estimate a confidence interval associated with any suitable confidence level. For example, the confidence level may be 99.997%, 99%, 95%, or any other suitable confidence level. In certain embodiments, the confidence level may be customizable by user 104 (e.g., user 104 may specify the confidence level through input 138).

Figure 3B:
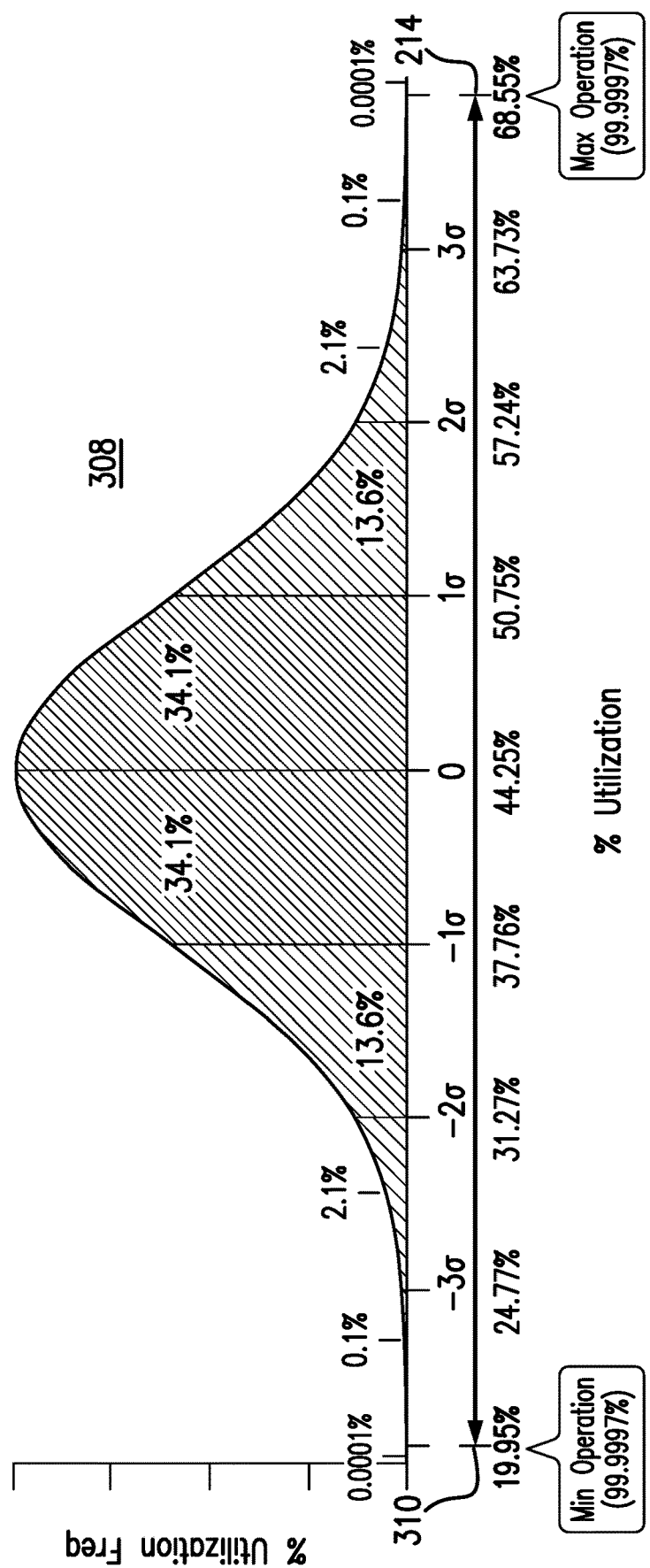
FIG. 3B presents an example capacity confidence interval generated by the data analyzer component of the server capacity optimizing tool of the system of FIG. 1.

Data analyzer 134 may use confidence interval algorithm 206 to estimate confidence intervals for the historical resource utilizations of each server 110a through 110n. For example, data analyzer 134 may use confidence interval algorithm 206 to estimate confidence intervals for the historical CPU utilization of server 110a, the historical RAM utilization of server 110a, the historical disk storage utilization of server 110a, and/or the historical utilization of any other appropriate computational resource of server 110a. As an example, FIG. 3B presents an example confidence interval 308 for the historical RAM utilization of a server 110, generated by applying confidence interval algorithm 206 to the historical RAM utilization data of server 110, stored in historical data 124. As illustrated in FIG. 3B, confidence interval 308 is associated with a confidence level of 99.9997%, such that a 99.9997% likelihood exists that the historical RAM utilization of server 110 lies between lower bound 310 and upper bound 208, where lower bound 310 corresponds to a 19.95% RAM utilization and upper bound 208 corresponds to a 68.55% RAM utilization.

Confidence interval algorithm 206 may be any suitable algorithm configured to estimate a confidence interval for the resource utilization of a server 110, where the confidence interval is associated with a given confidence level that the actual resource utilization of the server lies within the estimated range. For example, in certain embodiments, confidence interval algorithm 206 corresponds to a gradient descent algorithm. As another example, in certain embodiments, confidence interval algorithm 206 corresponds to a simplex method.

c. Capacity Spike Analysis

As a further example of a potential data analysis technique that may be used by data analyzer 134 to analyze historical data 124, in certain embodiments, and as illustrated in FIG. 2, data analyzer 134 may apply spike detecting algorithm 210 to historical data 124. Data analyzer 134 may use spike detecting algorithm 210 to identify spikes in the historical resource utilization of servers 110 and to determine whether such spikes are anomalous (and therefore not likely to affect future resource utilization levels) or are a normal property of the historical resource utilization (and are therefore expected to continue in the future).

In certain embodiments, spike detecting algorithm 210 may identify spikes in historical resource utilization data 124, by identifying the maximum value of the historical resource utilization data, and then determining (1) the number of times 212 that the historical resource utilization data exceeds a given percentage of the identified maximum and/or (2) the percentage of time 214 for which the historical resource utilization data exceeds the given percentage of the identified maximum. For each server 110a through 110n, spike detecting algorithm 210 may perform such analysis on any component of historical resource utilization data 124. For example, spike detecting algorithm 210 may perform such analysis on the historical CPU utilization data, the historical RAM utilization data, the historical disk storage utilization data, and/or the historical utilization data for any other suitable computational resource of server 110.

Figure 3C:
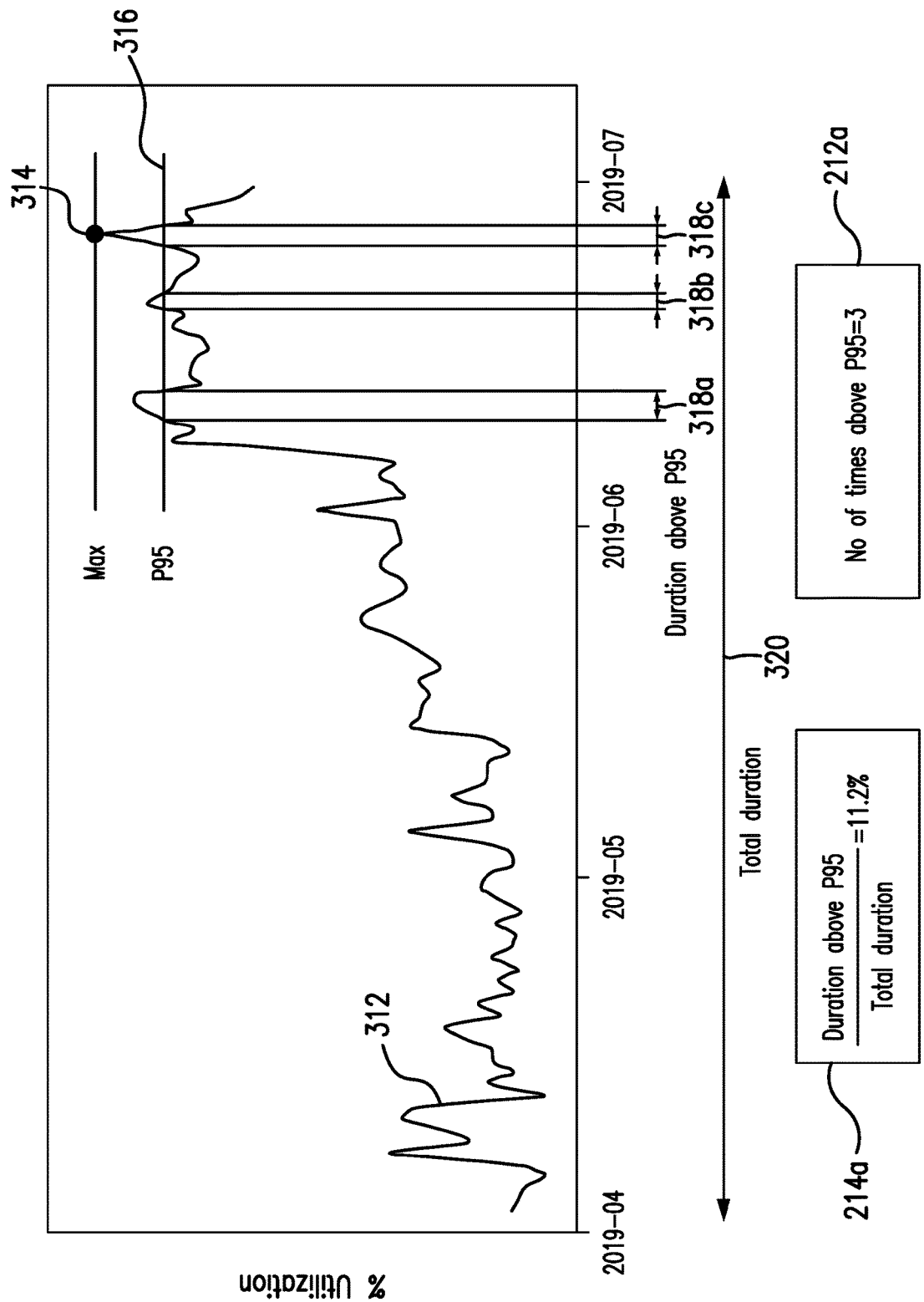
FIGS. 3C and 3D present examples of the analysis performed on historical utilization spikes by the data analyzer component of the server capacity optimizing tool of the system of FIG. 1.
Figure 3D:
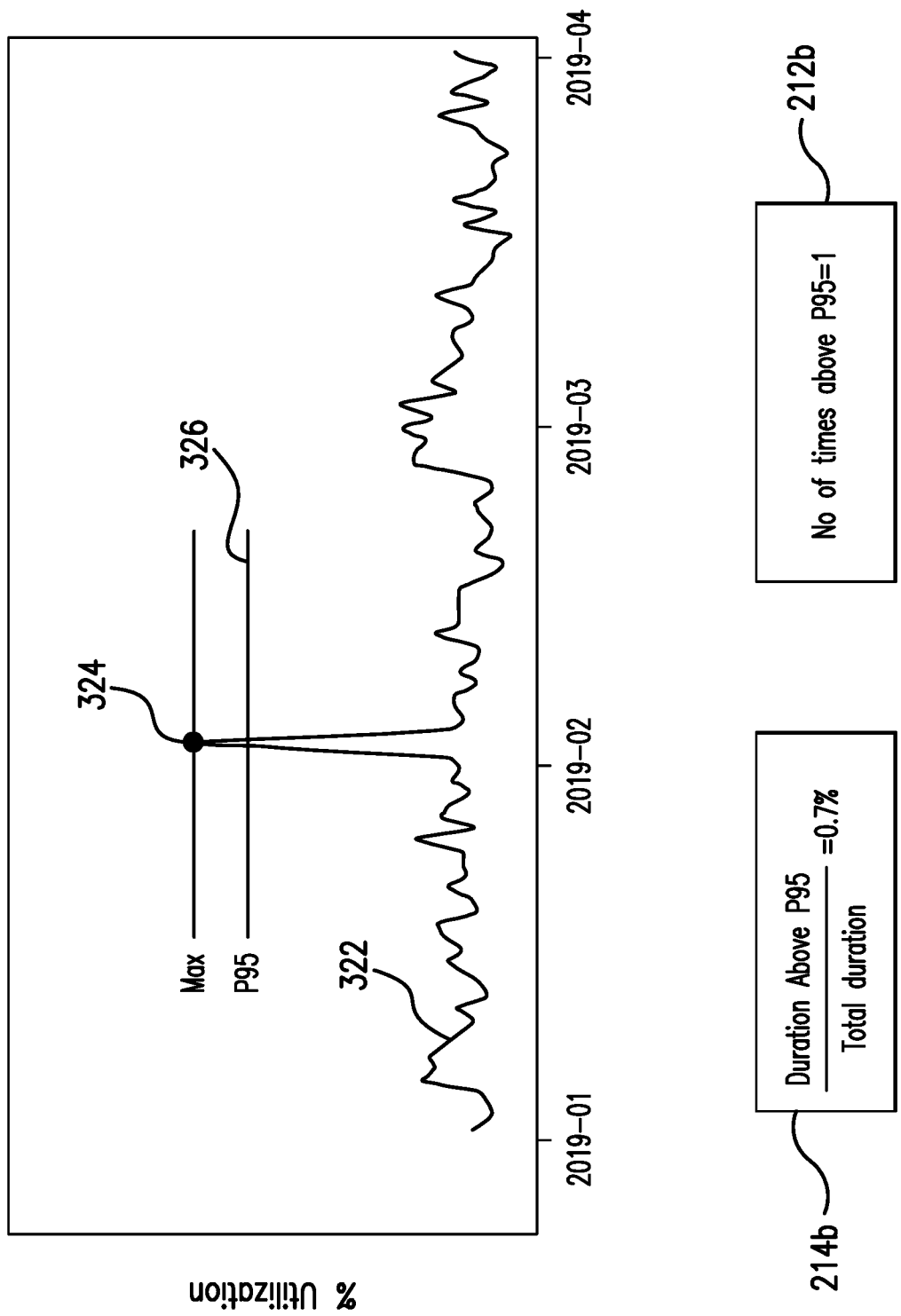

FIGS. 3C and 3D present examples of the analysis performed by spike detecting algorithm 210 on historical CPU utilization data stored in historical data 124. FIG. 3C presents an example in which spike detecting algorithm 210 may determine that the spikes in historical CPU utilization are normal and expected to continue in the future, while FIG. 3D presents an example in which spike detecting algorithm 210 may determine that the spike in historical CPU utilization is likely anomalous.

As illustrated in FIG. 3C, spike detecting algorithm 210 first identifies a maximum value 314 of the historical CPU utilization data 312. In certain embodiments, spike detecting algorithm 210 may identify maximum 314 as the global maximum of historical CPU utilization data 312. In some embodiments, spike detecting algorithm 210 may identify maximum 314 as a local maximum. For example, spike detecting algorithm 210 may identify maximum 314 as a local maximum in a specified range of the historical CPU utilization data 312.

After identifying maximum 314, spike detecting algorithm 210 next calculates a given percentage of maximum 314. This percentage may be any suitable percentage. For example, as illustrated in FIG. 3C, spike detecting algorithm 210 may calculate a value 316 that is 95% of the value of maximum 314. In certain embodiments, the given percentage may be customizable by user 104 (e.g., user 104 may specify the given percentage through input 138).

Spike detecting algorithm 210 next determines the number of distinct times 212a that the historical CPU utilization data 312 exceeds the given percentage 316 of the maximum 314, and the percentage 214a of total time for which the historical CPU utilization data 312 exceeds the given percentage 316 of the maximum 314. For example, as illustrated in FIG. 3C, historical CPU utilization data 312 exceeds the given percentage 316 of maximum 314 on three separate occasions—on a first occasion, for a first duration of time 318a, on a second occasion, for a second duration of time 318b, and on a third occasion, for a third duration of time 318c. Combining these durations and dividing by the total duration of time 320 for which historical CPU utilization data 312 was collected, yields a percentage 214a of total time for which historical CPU utilization data 312 exceeds the given percentage 316 of maximum 314. As illustrated in FIG. 3C, the value of this percentage 214a of total time for the example of FIG. 3C is 11.2%. In certain embodiments, spike detecting algorithm 210 may compare this percentage 214a of total time to a given threshold to determine whether the spikes in CPU utilization are normal or anomalous. For example, spike detecting algorithm 210 may determine that the spikes in CPU utilization are normal by determining that the percentage 214a of total time for which historical CPU utilization data 312 exceeds the given percentage 316 of maximum 314 is greater than the given threshold. The given threshold may be any suitable percentage. For example, the given threshold may be 1%, 2%, or any other suitable value. In certain embodiments, the given threshold may be customizable by user 104 (e.g., user 104 may specify the given threshold through input 138). In some embodiments, spike detecting algorithm 210 may apply a machine learning algorithm to the total number of spikes 212 and the percentage duration 214 of the spikes, where the machine learning algorithm is trained to determine whether the spikes are normal or anomalous based at least in part on the total number of spikes 212 and the percentage duration 214 of the spikes.

In contrast to FIG. 3C, in which historical CPU utilization data 312 exceeds 95% of the maximum value 314 of the historical CPU utilization data multiple times and for a significant total amount of time (11.2% of the total duration over which historical CPU utilization data 312 was measured), FIG. 3D presents an example in which historical CPU utilization data 322 exceeds 95% of the maximum value 324 of the historical CPU utilization data on a single occasion and for less than 0.7% of the total duration over which historical CPU utilization data 322 was measured. Given this short duration in time, in certain embodiments, spike detecting algorithm 210 may determine that spike 324 in historical CPU utilization data 322 is anomalous (e.g., spike detecting algorithm 210 may determine that spike 324 is anomalous by determining that the percentage 214b of total time for which historical CPU utilization data 322 exceeds 95% of maximum 324 is less than the given threshold).

In certain embodiments, recommendation generator 136 may use the determination that spike 324 in historical CPU utilization data 322 is likely anomalous, to generate reconfiguration recommendation 142. In some embodiments, data analyzer 134 may use the determination that spike 324 in historical CPU utilization data 322 is likely anomalous to modify historical CPU utilization data 322. For example, in response to determining that spike 324 is likely anomalous, data analyzer 134 may remove spike 324 from historical CPU utilization data 322. Data analyzer 134 may then apply forecasting algorithm 202 and confidence interval algorithm 206 to the modified historical CPU utilization data 322 to obtain potentially more accurate values for the maximum predicted CPU utilization 204, generated by forecasting algorithm 202, and the upper bound 208 of the confidence interval, generated by confidence interval algorithm 206, as compared with the values obtained from the unmodified historical CPU utilization data.

Data analyzer 134 may be a sub-processing component of capacity optimizing tool 102. For example, data analyzer 134 may include non-transitory computer readable instructions stored in memory 128 and executed by processor 126. For example, memory 128 may store forecasting algorithm 202, confidence interval algorithm 206, spike detecting algorithm 210, and/or any other suitable algorithm used by data analyzer 134 to analyze historical data 124. An example algorithm for data analyzer 134 is as follows: (1) access historical data 124; (2) apply spike detecting algorithm 210 to historical data 124 to identify a number 212 of spikes in historical data 124 and/or a percentage duration 214 of the spikes; (3) if spike detecting algorithm determines that the spikes are likely anomalous, remove the spikes from historical data 124; (4) apply forecasting algorithm 202 to historical data 124 to determine maximum predicted resource utilization 204; (5) apply confidence interval algorithm 206 to historical data 124 to determine a confidence interval for historical data 124, with upper bound 208; and (6) provide recommendation generator 136 with maximum predicted utilization 204 and upper bound 208.

d. Recommendation Generation

As illustrated in FIG. 2, recommendation generator 136 of capacity optimizing tool 102 uses the analysis performed by data analyzer 134 to generate reconfiguration recommendations 142 for servers 110. For example, in certain embodiments, recommendation generator 136 applies recommendation algorithm 216 to data consisting of: (1) the maximum predicted resource utilizations 204, generated by forecasting algorithm 202, (2) upper bounds 208 of the confidence interval generated by confidence interval algorithm 206, and/or (3) the number of spikes 212 in the historical resource utilization data 124 and the percent duration 214 of the spikes, determined by spike detecting algorithm 210, to generate reconfiguration recommendations 142.

As an example, in certain embodiments, recommendation algorithm 216 may generate reconfiguration recommendations 142 based on the maximum predicted resource utilizations 204. As described above, maximum predicted resource utilizations 204 correspond to predictions of the maximum resource utilization of servers 110 over a given time interval in the future. For example, for each server 110a through 110n, maximum predicted resource utilizations 204 may include a maximum predicted CPU utilization over the future time interval, a maximum predicted RAM utilization over the future time interval, a maximum predicted disk storage utilization over the future time interval, and/or a maximum predicted utilization of any other suitable computation resource over the future time interval. Based on these maximum predicted future utilizations, recommendation algorithm may determine that one or more servers 110 are underutilized or overutilized. For example, recommendation algorithm 216 may determine that a server 110 is underutilized if a maximum predicted utilization of one or more of its computational resources is below a given threshold. Similarly, recommendation algorithm 216 may determine that a server 110 is overutilized if a maximum predicted utilization of one or more of its computational resources is above a given threshold.

As another example, in certain embodiments, recommendation algorithm 216 may generate reconfiguration recommendations 142 based on the upper bounds 206 of the confidence intervals generated by confidence interval algorithm 206. As described above, upper bound 206 corresponds to an estimate of the maximum possible value of the historical resource utilization of a given server 110 (e.g., if the confidence level associated with the confidence interval is set at 99.997%, there is a 99.997% likelihood that the maximum historical resource utilization lies below upper bound 208). For example, for each server 110a through 110n, upper bound 206 may correspond to an estimate of the maximum possible value of the historical CPU utilization, the historical RAM utilization, the historical disk storage utilization, and/or the historical utilization of any other appropriate computational resource. Based on these estimates of the maximum possible historical resource utilizations, recommendation algorithm may determine that one or more servers 110 are underutilized or overutilized. For example, recommendation algorithm 216 may determine that a server 110 is underutilized if an estimate of the maximum possible historical value of one or more of its computational resources is below a given threshold. Similarly, recommendation algorithm 216 may determine that a server 110 is overutilized if an estimate of the maximum possible historical value of one or more of its computation resources is above a given threshold.

As another example, in certain embodiments, recommendation algorithm 216 may generate reconfiguration recommendations 142 based on both the maximum predicted resource utilizations 204, generated by forecasting algorithm 202, and the upper bounds 208, generated by confidence interval algorithm 206. For example, recommendation algorithm 216 may determine whether a server 110 is underutilized/overutilized based on the larger of the maximum predicted resource utilizations 204 of the server and the upper bounds 208 estimated for the server, the smaller of the maximum predicted resource utilizations 204 of the server and the upper bounds 208 estimated for the server, the average of the maximum predicted resource utilizations 204 of the server and the upper bounds 208 estimated for the server, or any other suitable combination of the maximum predicted resource utilizations 204 of the server and the upper bounds 208 estimated for the server. As an example, recommendation algorithm 216 may determine that a given server 110 is underutilized if both a maximum predicted utilization of one or more of its computational resources is below a given threshold and the upper bound 208 of the confidence interval calculated for the one or more computational resources is also below the given threshold. As another example, recommendation algorithm 216 may determine that a given server 110 is overutilized if either (or both) of the maximum predicted resource utilization 204 of the server and the upper bound 208 estimated for the server exceed a given threshold.

In certain embodiments, recommendation algorithm 216 may take into account the spikes in historical resource utilization data 124, identified by spike detecting algorithm 210, in determining whether a server 110 is overutilized or underutilized. For example, recommendation algorithm 216 may determine that a given server 110 is likely not overutilized, despite the fact that one or both of the maximum predicted resource utilizations 204 of the server and the upper bounds 208 estimated for the server exceed a given threshold, where spike detecting algorithm 210 has detected one or more anomalous spikes in the historical data, which may be leading to overestimates of the maximum predicted resource utilizations 204 and/or upper bounds 208.

In some embodiments, recommendation algorithm 216 may use a machine learning algorithm to determine whether a given server 110 is underutilized or overutilized. Such a machine learning algorithm may be trained to identify underutilized and/or overutilized servers 110 based on the output from data analyzer 134.

In response to a determination that one or more servers 110 are underutilized, recommendation algorithm 216 may generate recommendations 142 to consolidate two or more of the identified servers and/or release computational resources associated with one or more of the identified servers. As an example, consider the maximum predicted/estimated resource utilizations for servers 110a through 110d, depicted in Table 1. These maximum predicted/estimated resource utilizations may correspond to maximum predicted utilizations 204, generated by forecasting algorithm 202, estimated upper bounds 208 of confidence intervals generated by confidence interval algorithm 206, or some combination of the maximum predicted utilizations 204 and upper bounds 208 (e.g., the larger of the two values, the smaller of the two values, an average of the two values, etc.).

TABLE 1

Example Maximum Predicted Resource Utilizations

| Server | Available CPU (cores) | Available RAM (GB) | Max Predicted/ Estimated CPU utilization (%) | Max Predicted/ Estimated CPU utilization (cores) | Max Predicted/ Estimated RAM utilization (%) | Max Predicted/ Estimated RAM utilization (GB) |
|---|---|---|---|---|---|---|
| 110a | 1 | 2 | 40% | 0.4 | 20% | 0.4 |
| 110b | 4 | 8 | 20% | 0.8 | 10% | 0.8 |
| 110c | 2 | 4 | 105% | 2.1 | 90% | 3.6 |
| 110d | 1 | 4 | 65% | 0.65 | 70% | 2.8 |

Based on the maximum predicted/estimated resource utilizations listed in Table 1, recommendation algorithm 216 may determine that first server 110a and second server 110b are underutilized and that third server 110c is overutilized. For example, recommendation algorithm 216 may determine that first server 110a and second server 110b are underutilized because they are associated with maximum predicted/estimated utilizations that are below 50%. On the other hand, recommendation algorithm 216 may determine that third server 110c is overutilized because it is associated with a maximum predicted/estimated CPU utilization that is over 100%. Accordingly, recommendation algorithm 216 may generate recommendations 142 to consolidate first server 110a with second server 110b and/or release computational resources associated with first server 110a and/or second server 110b. Recommendation algorithm 216 may also generate a recommendation to add computational resources to third server 110c. As an example, recommendation algorithm 216 may generate recommendations 142 suggesting that (1) first server 110a should be consolidated with second server 110b (e.g., the applications running on first server 110a should be transferred to second server 110b, and the computation resources associated with first server 110a should be released) and (2) the computational resources gained by consolidating first server 110a and second server 110b should be transferred to third server 110c (e.g., the CPU core and 2 GB of memory associated with first server 110a should be transferred to third server 110a). As another example, recommendation algorithm 216 may generate recommendations 142 suggesting that (1) 2 CPU cores and 6 GB of RAM should be released from second server 110b and (2) at least one of the released CPU cores should be transferred to third server 110c.

Recommendation generator 126 may use any suitable algorithm 216 to generate recommendations 142. For example, in certain embodiments, recommendation generator 126 may use a bin packing algorithm to identify two or more underutilized servers 110 to consolidate into one or more servers.

In certain embodiments, recommendation generator 136 may transmit recommendations 142 to system administrators 104. Such system administrators may then choose whether or not to implement the recommendations. In some embodiments, recommendation generator 136 may automatically implement recommendations 142. For example, recommendation generator 136 may generate reconfiguration commands 144 to implement recommendations 142. Reconfiguration commands 144 may be executed on servers 110 to reconfigure the servers. For example, in certain embodiments, reconfiguration commands 144 may be transmitted to the hosting provider of servers 110, for execution by the hosting provider. In certain embodiments, reconfiguration commands 144 may be generated based on a library of available reconfiguration commands 130 stored in memory 128. For example, library 130 may include commands to transfer applications from a first server 110a to a second server 110b, to release computational resources associated with a given server 110, and/or to add computational resources to a given server 110. In some embodiments, recommendation generator 136 may generate reconfiguration commands 144 based on an analysis of the current status of the servers. For example, in certain embodiments in which recommendations 142 include a recommendation to consolidate first server 110a with second server 110b, recommendation generator 136 may first identify those applications 112 currently installed on and/or running on first server 110a. Recommendation generator 136 may then generate reconfiguration commands 144 that include commands to transfer those applications currently installed and running on first server 110a to second server 110b and then to release the computational resources associated with first server 110a.

Recommendation generator 136 may be a sub-processing component of capacity optimizing tool 102. For example, recommendation generator 136 may include non-transitory computer readable instructions stored in memory 128 and executed by processor 126. An example algorithm for recommendation generator 136 is as follows: (1) receive output data from data analyzer 134, where the output data includes maximum predicted resource utilizations 204 generated by forecasting algorithm 202, upper bounds 208 generated by confidence interval algorithm 206, and/or the number of spikes 212 and the duration 214 of such spikes, determined by spike detecting algorithm 210; (2) identify, based on the output data received from data analyzer 134, whether any of servers 110 are underutilized or overutilized; (3) generate recommendation 142, where recommendation 142 includes recommendations to consolidate two or more underutilized servers, release computational resources associated with underutilized servers, and/or add computational resources to overutilized servers; and (4) transmit recommendation 142 to system administrator 104.

III. Method of Identifying Sub-Optimal Server Capacity

Figure 4:
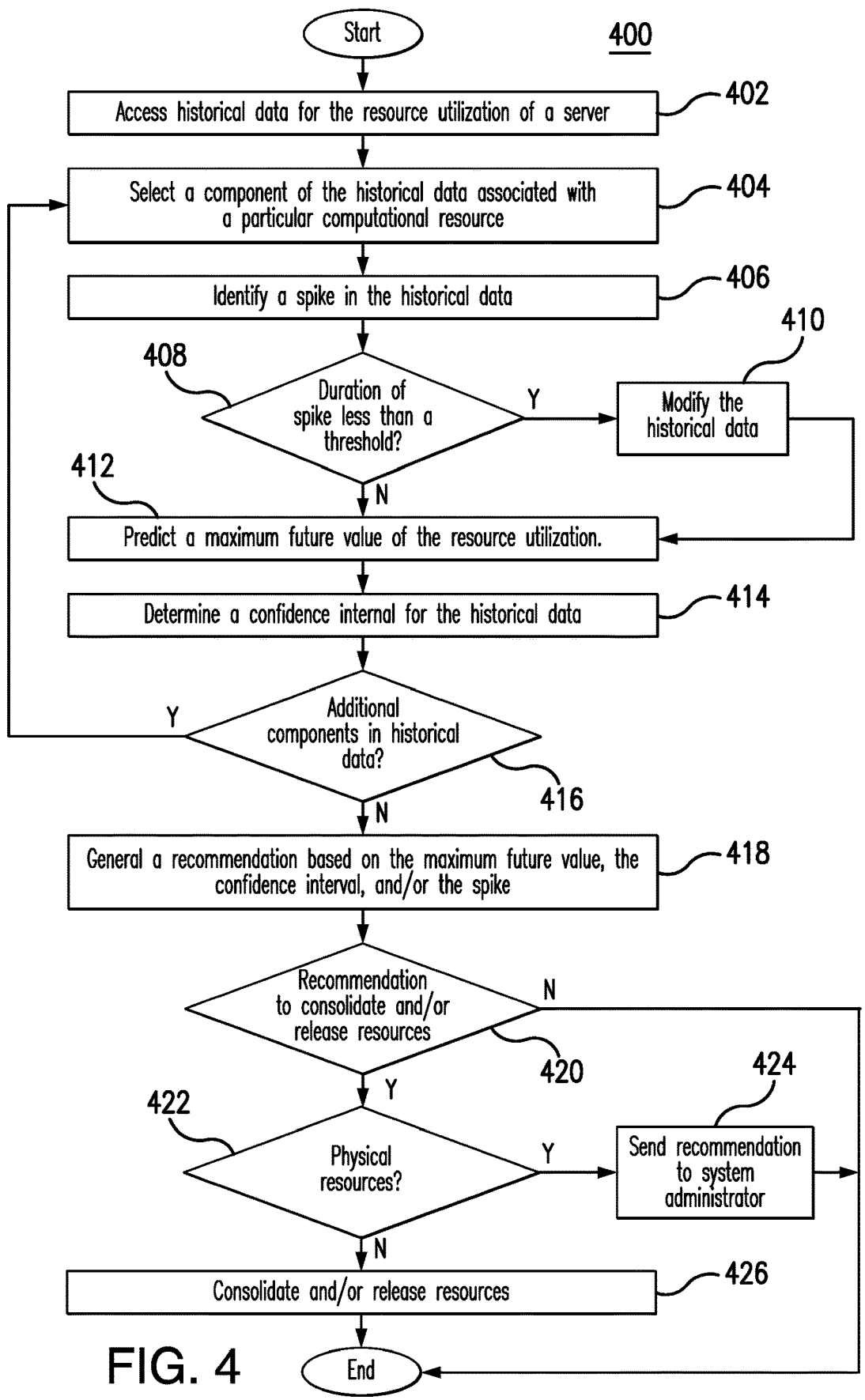
FIG. 4 presents a flowchart illustrating the process by which the server capacity optimizing tool of the system of FIG. 1 identifies an underutilized server and reacts accordingly.

FIG. 4 presents a flowchart illustrating an example method by which server capacity optimizing tool 102 identifies an underutilized server 110a. In step 402, capacity optimizing tool 102 accesses historical resource utilization data 124a. Historical resource utilization data 124a may include historical CPU utilization data for server 110a, historical RAM utilization data for server 110a, historical disk storage utilization data for server 110a, and/or historical utilization data for any other appropriate computational resource associated with server 110a. In step 404 capacity optimizing tool 102 selects a first component of historical resource utilization data 124a associated with a first computational resource belonging to server 110a (e.g., historical CPU utilization data, historical RAM utilization data, or historical disk storage utilization data). In step 406, capacity optimizing tool 102 uses spike detecting algorithm 210 to identify a spike in the selected component of historical data 124a. For example, capacity optimizing tool 102 may identify a spike in historical resource utilization data 124a by identifying a maximum of the historical resource utilization data 124. In step 408, capacity optimizing tool 102 determines whether the duration of the spike is less than a given threshold. In certain embodiments, capacity optimizing tool 102 may determine the duration of the spike by determining the amount of time for which the historical resource utilization data exceeds a given percentage of the identified maximum. In some embodiments, determining whether the duration of the spike is less than a given threshold corresponds to determining whether the percent duration of the spike, measured with regard to the total duration of the historical resource utilization data, is less than a given threshold.

If, in step 408, capacity optimizing tool 102 determines that the duration of the spike is less than the threshold, in step 410 capacity optimizing tool 102 modifies the selected component of historical data 124a. For example, capacity optimizing tool 102 may remove the spike from historical data 124a.

In step 412, capacity optimizing tool 102 uses forecasting algorithm 202 to predict a maximum future resource utilization 204 for server 110a, based on the selected component of historical data 124a. In step 414, capacity optimizing tool 102 uses confidence interval algorithm 206 to generate a confidence interval for the selected component of historical data 124a, where the confidence interval includes upper bound 208.

In step 416, capacity optimizing tool 102 determines whether historical data 124a includes any additional components associated with computational resources belonging to server 110a. If, in step 416, capacity optimizing tool 102 determines that historical data 124a includes one or more additional components, method 400 returns to step 404. If, in step 416 capacity optimizing tool 102 determines that historical data 124a does not include any additional components, method 400 proceeds to step 418.

In step 418 capacity optimizing tool 102 generates reconfiguration recommendation 142, based on the maximum future resource utilizations 204 generated by forecasting algorithm 202, the upper bounds 208 determined by confidence interval algorithm 206, and/or the spikes identified by spike detecting algorithm 210. In step 420 capacity optimizing tool 102 determines whether recommendation 142 includes a recommendation to consolidate server 110a with another server 110 and/or to release a portion of the computational resources associated with server 110a.

If, in step 420 capacity optimizing tool 102 determines that recommendation 142 includes a recommendation to consolidate server 110a with another server 110 and/or to release a portion of the computational resources associated with server 110a, in step 422 capacity optimizing tool 102 determines whether server 110a is a physical, on-premises server or a cloud-based server. If, in step 422 capacity optimizing tool 102 determines that server 110a is a physical, on premises server, in step 424 capacity optimizing tool 102 sends recommendation 142 to a user device 106 associated with a system administrator 104. If, in step 422 capacity optimizing tool 102 determines that server 110a is a cloud-based server, in step 426 consolidates server 110a with another server 110 and/or releases a portion of the computational resources associated with server 110a, according to recommendation 142. For example, capacity optimizing tool 102 may generate reconfiguration commands 144 and execute reconfiguration commands 144 on server 110a.

Modifications, additions, or omissions may be made to method 400 depicted in FIG. 4. Method 400 may include more, fewer, or other steps. For example, steps may be performed in parallel or in any suitable order. While discussed as capacity optimizing tool 102 (or components thereof) performing the steps, any suitable component of system 100, such as device(s) 104 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. A system comprising:
a first server associated with a resource utilization;
a database configured to store historical data for the first server comprising time-series values of the resource utilization of the first server collected from the first server over a first period of time; and
a hardware processor configured to:
identify, from the historical data, a maximum value of the resource utilization from the time-series values of the resource utilization of the first server collected from the first server over the first period of time;
determine, from the historical data, a first duration of time comprising a number of distinct times during which the time-series values of the resource utilization of the first server collected from the first server over the first period of time exceed a given percentage of the maximum value of the resource utilization;
predict, based on the historical data, a maximum predicted value of the resource utilization of the first server over a second period of time later than the first period of time;
determine, based on the historical data, a first confidence interval for the resource utilization of the first server, the first confidence interval comprising an upper bound of the first confidence interval;
generate, based at least on the maximum value of the resource utilization of the first server collected from the first server over the first period of time, the first duration of time, the maximum predicted value of the resource utilization of the first server over the second period of time, and the upper bound of the first confidence interval, a recommendation comprising at least one of:
a recommendation to consolidate the first server with a second server; and
a recommendation to release computational resources of the first server to the second server;
transmit the recommendation to a user device associated with a system administrator;
in response to generating the recommendation:
identify one or more applications running on the first server; and
transfer the one or more applications running on the first server to the second server to release the computational resources of the first server.

2. The system of claim 1, wherein, in response to releasing the computational resources of the first server, the processor is further configured to assign the computational resources of the first server to a third server.

3. The system of claim 1, wherein:
the processor is further configured to:
determine whether a percentage of the first duration of time over the first period of time is less than a threshold; and
in response to determining the percentage of the first duration of time over the first period of time is less than the threshold, remove the maximum value of the resource utilization from the historical data, wherein:
predicting the maximum predicted value of the resource utilization of the first server over the second period of time is further based on the determination that the percentage of the first duration of time over the first period of time is less than the threshold; and
determining the first confidence interval for the resource utilization of the first server is further based on the determination that the percentage of the first duration of time over the first period of time is less than the threshold.

4. The system of claim 1, wherein the computation resources comprise at least one of:
computer processing units (CPUs);
random-access memory (RAM); and
disk storage.

5. The system of claim 1, wherein determining the first confidence interval comprises at least one of:
implementing a gradient descent algorithm; and
implementing a simplex method.

6. The system of claim 1, wherein predicting the maximum predicted value of the resource utilization of the first server over the second period of time comprises performing a time-series analysis of the time-series values of the resource utilization of the first server collected from the first server over the first period of time.

7. The system of claim 1, wherein:
the processor is further configured to:
determine, from the historical data, a plurality of duration of times during which the values of the resource utilization of the first server collected from the first server over the first period of time exceed a given percentage of the maximum value of the resource utilization;
determine whether a percentage of a total of the duration of times over the first period of time is more than a threshold; and
in response to determining the percentage of the plurality of duration of times over the first period of time is more than the threshold, determine the maximum value of the resource utilization from the historical data is normal.

8. A method comprising:
accessing historical data for a first server, the first server associated with a resource utilization, the historical data comprising time-series values of the resource utilization of the first server collected from the first server over a first period of time;
identifying, from historical data, a maximum value of the resource utilization of the first server from the time-series values of the resource utilization collected from the first server over the first period of time;
determining, from the historical data, a first duration of time comprising a number of distinct times during which the time-series values of the resource utilization of the first server collected from the first server over the first period of time exceed a given percentage of the maximum value of the resource utilization;
predicting, based on the historical data, a maximum predicted value of the resource utilization of the first server over a second period of time later than the first period of time;
determining, based on the historical data, a first confidence interval for the resource utilization of the first server, the first confidence interval comprising an upper bound of the first confidence interval;
generating, based at least on the maximum value of the resource utilization of the first server collected from the first server over the first period of time, the first duration of time, the maximum predicted value of the resource utilization of the first server over the second period of time, and the upper bound of the first confidence interval, a recommendation comprising at least one of:
- a recommendation to consolidate the first server with a second server; and
- a recommendation to release computation resources of the first server to the second server;

transmitting the recommendation to a user device associated with a system administrator;
in response to generating the recommendation:
- identifying one or more applications running on the first server; and
- transferring the one or more applications running on the first server to the second server to release the computational resources of the first server.

9. The method of claim 8, further comprising, in response to releasing the computational resources of the first server, assigning the computation resources of the first server to a third server.

10. The method of claim 8, further comprising:
determining whether a percentage of the first duration of time over the first period of time is less than a threshold; and
in response to determining the percentage of the first duration of time over the first period of time is less than the threshold, removing the maximum value of the resource utilization from the historical data, wherein:
predicting the maximum predicted value of the resource utilization of the first server over the second period of time is further based on the determination that the percentage of the first duration of time over the first period of time is less than the threshold; and
determining the first confidence interval for the resource utilization of the first server is further based on the determination that the percentage of the first duration of time over the first period of time is less than the threshold.

11. The method of claim 8, wherein the computation resources comprise at least one of:
computer processing units (CPUs);
random-access memory (RAM); and
disk storage.

12. The method of claim 8, wherein determining the first confidence interval comprises at least one of:
implementing a gradient descent algorithm; and
implementing a simplex method.

13. The method of claim 8, wherein predicting the maximum predicted value of the resource utilization of the first server over the second period of time comprises performing a time-series analysis of the time-series values of the resource utilization of the first server collected from the first server over the first period of time.

14. An apparatus comprising:
a hardware processor configured to:
access a database storing historical data for a first server, the first server associated with a resource utilization, the historical data comprising time-series values of the resource utilization of the first server collected from the first server over a first period of time;
identify, from the historical data, a maximum value of the resource utilization of the first server from the time-series values of the resource utilization collected from the first server over the first period of time;
determine, from the historical data, a first duration of time comprising a number of distinct times during which the time-series values of the resource utilization of the first server collected from the first server over the first period of time exceed a given percentage of the maximum value of the resource utilization;
predict, based on the historical data, a maximum predicted value of the resource utilization of the first server over a second period of time later than the first period of time;
determine, based on the historical data, a first confidence interval for the resource utilization of the first server, the first confidence interval comprising an upper bound of the first confidence interval;
generate, based at least on the maximum value of the resource utilization of the first server collected from the first server over the first period of time, the first duration of time, the maximum predicted value of the resource utilization of the first server over the second period of time, and the upper bound of the first confidence interval, a recommendation comprising at least one of:
- a recommendation to consolidate the first server with a second server; and
- a recommendation to release computation resources of the first server to the second server;

transmit the recommendation to a user device associated with a system administrator;
in response to generating the recommendation:
- identify one or more applications running on the first server; and
- transfer the one or more applications running on the first server to the second server to release the computational resources of the first server.

15. The apparatus of claim 14, wherein, in response to releasing the computational resources of the first server, the processor is further configured to assign the computational resources of the first server to a third server.

16. The apparatus of claim 14, wherein:
the processor is further configured to:
determine whether a percentage of the first duration of time over the first Period of time is less than a threshold;
in response to determining the percentage of the first duration of time over the first period of time is less than the threshold, remove the maximum value of the resource utilization from the historical data, wherein:
predicting the maximum predicted value of the resource utilization of the first server over the second period of time is further based on the determination that the percentage of the first duration of time over the first period of time is less than the threshold; and
determining the first confidence interval for the resource utilization of the first server is further based on the determination that the percentage of the first duration of time over the first period of time is less than the threshold.

17. The apparatus of claim 14, wherein the computation resources comprise at least one of:
computer processing units (CPUs);
random-access memory (RAM); and
disk storage.

18. The apparatus of claim 14, wherein predicting the maximum predicted value of the resource utilization of the first server over the second period of time comprises performing a time-series analysis of the time-series values of the resource utilization of the first server collected from the first server over the first period of time.

* * * * *